US012590766B2

(12) United States Patent
Buchner et al.

(10) Patent No.: US 12,590,766 B2
(45) Date of Patent: Mar. 31, 2026

(54) TEMPERATURE CONTROL APPARATUS FOR A GASEOUS MEDIUM

(71) Applicant: AVL LIST GMBH, Graz (AT)

(72) Inventors: Michael Buchner, Graz (AT); Sandro Masotti, Villanders (IT); Stefan Karanovic, Graz (AT); Thomas Rothlaender, Graz (AT); Katarzyna Kudlaty, Goessendorf (AT); Andreas Klug, Semriach (AT)

(73) Assignee: AVL LIST GMBH, Graz (AT)

( * ) Notice: Subject to any disclaimer, the term of this patent is extended or adjusted under 35 U.S.C. 154(b) by 111 days.

(21) Appl. No.: 18/270,839

(22) PCT Filed: Jan. 4, 2022

(86) PCT No.: PCT/AT2022/060001

§ 371 (c)(1),
(2) Date: Jul. 4, 2023

(87) PCT Pub. No.: WO2022/147589

PCT Pub. Date: Jul. 14, 2022

(65) Prior Publication Data

US 2024/0068753 A1 Feb. 29, 2024

(30) Foreign Application Priority Data

Jan. 5, 2021 (AT) .............................. A 50002/2021

(51) Int. Cl.
*F28D 9/00* (2006.01)
*F02M 21/02* (2006.01)
(Continued)

(52) U.S. Cl.
CPC ....... *F28D 9/0081* (2013.01); *F02M 21/0227* (2013.01); *F02M 31/04* (2013.01);
(Continued)

(58) Field of Classification Search
CPC .... B33Y 80/00; F02M 21/0227; F02M 31/00; F02M 31/04; F02M 31/125; F02M 31/20;
(Continued)

(56) References Cited

U.S. PATENT DOCUMENTS

| | | | | |
|---|---|---|---|---|
| 4,972,902 A | | 11/1990 | Ninomiya | |
| 2010/0081191 A1* | | 4/2010 | Woods ...................... | B01L 7/52 435/303.1 |

(Continued)

FOREIGN PATENT DOCUMENTS

| | | | |
|---|---|---|---|
| AT | 007 373 U1 | 2/2005 | |
| DE | 20 2009 007 875 U1 | 9/2009 | |

(Continued)

*Primary Examiner* — Eric S Ruppert
*Assistant Examiner* — Hans R Weiland
(74) *Attorney, Agent, or Firm* — Norman B. Thot

(57) ABSTRACT

A temperature control device for a gaseous media. The temperature control device includes a first heat exchanger layer in which a medium channel for a gas to be temperature-controlled is formed, a second heat exchanger layer which extracts heat from and/or supplies heat to the first heat exchanger layer, and a diffusion layer which is arranged between the first heat exchanger layer and the second heat exchanger layer. The diffusion layer is open to the gas to be temperature-controlled.

20 Claims, 3 Drawing Sheets

(51) Int. Cl.

| | |
|---|---|
| ***F02M 31/04*** | (2006.01) |
| ***F02M 31/125*** | (2006.01) |
| ***F02M 31/20*** | (2006.01) |
| ***F28F 3/00*** | (2006.01) |
| ***F28F 3/12*** | (2006.01) |
| ***F28F 21/08*** | (2006.01) |
| *F28F 1/00* | (2006.01) |

(52) U.S. Cl.
CPC .......... *F02M 31/125* (2013.01); *F02M 31/20* (2013.01); *F28F 3/005* (2013.01); *F28F 3/12* (2013.01); *F28F 21/084* (2013.01); *F28F 1/003* (2013.01); *F28F 2265/16* (2013.01)

(58) Field of Classification Search
CPC .. F28D 7/04; F28D 9/0081; F28D 9/04; F28F 1/003; F28F 3/005; F28F 3/12; F28F 2265/16
See application file for complete search history.

(56) References Cited

U.S. PATENT DOCUMENTS

| | | | | |
|---|---|---|---|---|
| 2012/0060775 | A1* | 3/2012 | Aixala .................. | F01N 11/002 123/2 |
| 2013/0219872 | A1* | 8/2013 | Gibble .................. | F01K 23/065 60/320 |
| 2014/0000670 | A1* | 1/2014 | Oesterle ................. | H10N 10/17 136/212 |
| 2014/0072015 | A1* | 3/2014 | Han ................... | G05D 23/1919 374/179 |
| 2014/0356985 | A1* | 12/2014 | Ricci ................... | C23C 16/4586 118/712 |
| 2016/0377330 | A1 | 12/2016 | Burazer et al. | |
| 2018/0164003 | A1* | 6/2018 | Burazer ................. | H10N 10/17 |
| 2018/0170750 | A1 | 6/2018 | Del-Gallo et al. | |
| 2021/0025356 | A1 | 1/2021 | Neyer | |
| 2021/0398799 | A1 | 12/2021 | Kobayashi et al. | |
| 2022/0146293 | A1 | 5/2022 | Buchner et al. | |

FOREIGN PATENT DOCUMENTS

| | | | | | |
|---|---|---|---|---|---|
| DE | 10 2014 102 067 | A1 | | 8/2015 | |
| JP | 2008-184864 | A | | 8/2008 | |
| JP | 2008186913 | A | * | 8/2008 | ......... G05D 23/1919 |
| JP | 2020-87979 | A | | 6/2020 | |
| WO | WO 01/13032 | | | 2/2001 | |

* cited by examiner

TEMPERATURE CONTROL APPARATUS FOR A GASEOUS MEDIUM

CROSS REFERENCE TO PRIOR APPLICATIONS

This application is a U.S. National Phase application under 35 U.S.C. § 371 of International Application No. PCT/AT2022/060001, filed on Jan. 4, 2022 and which claims benefit to Austrian Patent Application No. A50002/2021, filed on Jan. 5, 2021. The International Application was published in German on Jul. 14, 2022 as WO 2022/147589 A1 under PCT Article 21(2).

FIELD

The present invention relates to a temperature control device for a gaseous media with a first heat exchanger layer in which a medium channel for a gas to be temperature-controlled is formed and a second heat exchanger layer via which heat can be extracted from and/or supplied to the first heat exchanger layer.

BACKGROUND

Such temperature control devices are used, for example, in systems for measuring the consumption of fuels, in particular compressed natural gas or hydrogen, where they form part of a conditioning device which is used to regulate the fuel to a predefined pressure and temperature in order to obtain reliable measurement results. Coriolis flow meters are thereby most commonly used as measuring instruments. Such a system for measuring consumption is described, for example, in WO 2020/186279 A1.

The problem with known temperature control devices is that the heat exchangers used are for the most part too sluggish to carry out rapid temperature changes and thereby achieve a constant temperature of the fuel for a correct measurement of the flow sensors.

To solve these problems, temperature control units are described in AT 516 611 A4 and in AT 516 385 A4 which consist of a first heat exchanger layer in which a spiral flow channel for the fuel is formed, a second layer in which thermoelectric elements are arranged, and a third layer in which a coolant channel is formed through which the heat from the warm side of the thermoelectric elements is to be dissipated when cooling the media flow which is to be temperature controlled.

The problem with these temperature control units is, however, that hairline cracks can arise on the individual heat exchanger layers due to existing stresses which are caused in particular by the sometimes high temperature differences. If the gas to be temperature-controlled is hydrogen, for example, it must be possible to exclude the possibility of the hydrogen diffusing into the coolant. If the two heat exchanger layers lie close on top of each other, however, it cannot be excluded that, despite the pressure in the media line for the coolant, hydrogen will penetrate into the coolant, which would, for example, make the coolant flammable. This presents a problem for refrigeration machines that cool the coolant and are not designed for explosive and/or flammable media.

SUMMARY

An aspect of the present invention is therefore to provide a temperature control device for a gaseous media with which penetration of the medium to be cooled into the coolant or in the opposite direction can be reliably prevented without negatively influencing the heat transfer between the various heat exchanger layers. An aspect of the present invention is also the possibility to control the temperature of the medium flow as quickly and as accurately as possible, regardless of whether heat must be added to or removed from the medium flow.

In an embodiment, the present invention provides a temperature control device for a gaseous media. The temperature control device includes a first heat exchanger layer in which a medium channel for a gas to be temperature-controlled is formed, a second heat exchanger layer which is configured so that heat is at least one of extractable from and suppliable to the first heat exchanger layer, and a diffusion layer which is arranged between the first heat exchanger layer and the second heat exchanger layer. The diffusion layer is open to the gas to be temperature-controlled.

BRIEF DESCRIPTION OF THE DRAWINGS

The present invention is described in greater detail below on the basis of embodiments and of the drawings in which.

DETAILED DESCRIPTION

Figure 1:
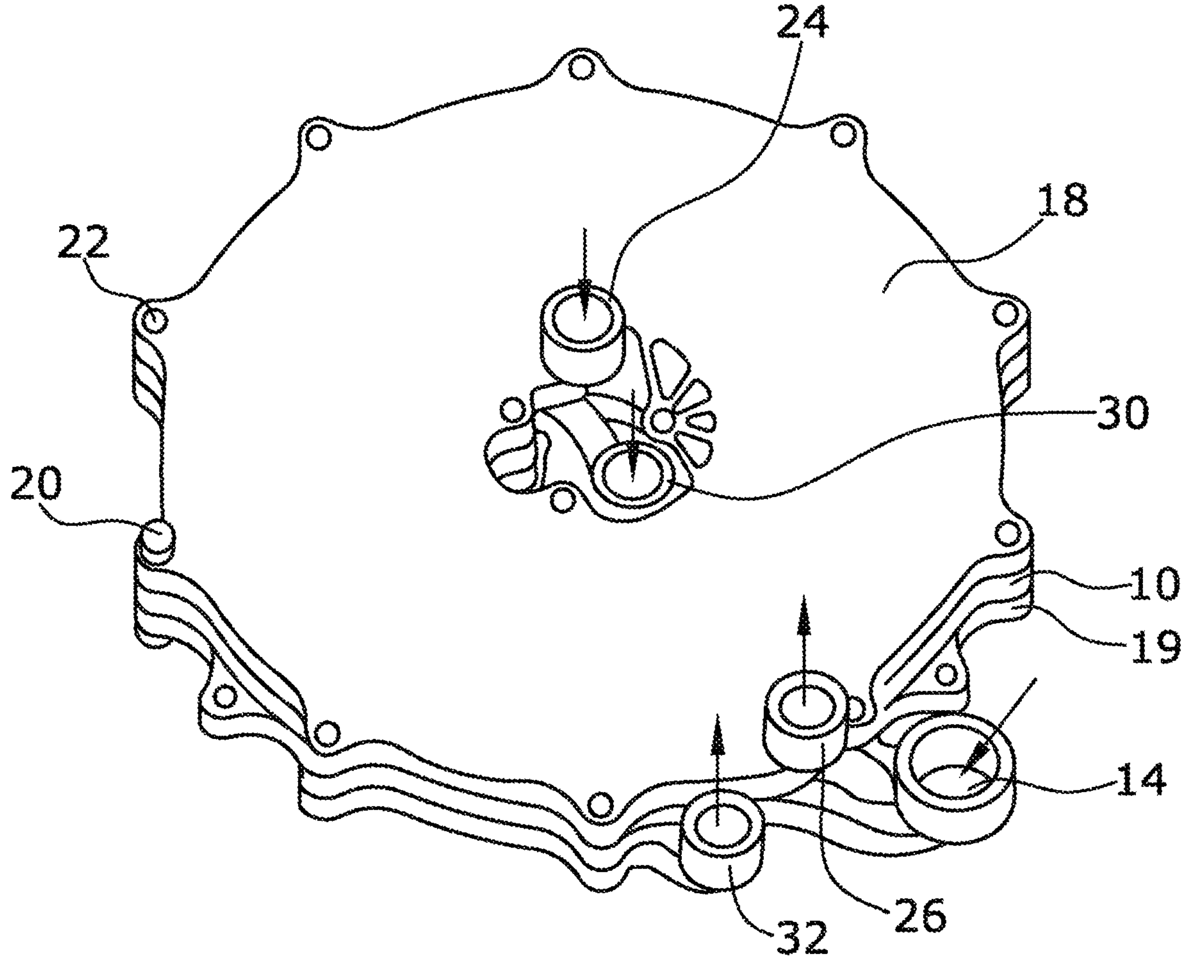
FIG. 1 shows a perspective view of a temperature control device according to the present invention as a top view.
Figure 2:
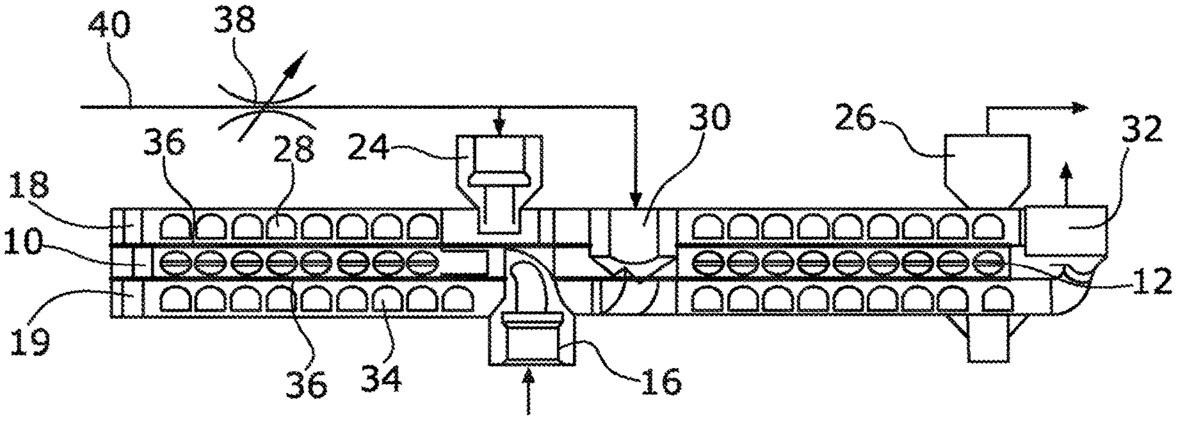
FIG. 2 shows a cross-section through the temperature control device of FIG. 1.

The temperature control device for a gaseous media according to the present invention has a first heat exchanger layer, which is designed, for example, as a heat exchanger plate made of stainless steel. A medium channel for a gaseous or liquid gas to be temperature-controlled is formed in this heat exchanger layer. This can in particular be natural gas or hydrogen. The medium channel can either be inserted into the heat exchanger layer and thus have its own channel walls or be constructed in one piece as channel-forming openings in the interior of the heat exchanger plate. The temperature control device also has a second heat exchanger layer which can in turn be designed as a heat exchanger plate and can have a channel which is formed integrally with the plate in the form of internal openings or which is designed as an insert in the heat exchanger layer. The second heat exchanger layer may, however, also otherwise extract or supply heat to the first heat exchanger layer, such as via thermoelectric elements, such as Peltier elements. Regardless of the design of the second heat exchanger layer, it thus serves to extract heat from and/or supply heat to the first heat exchanger layer.

In order to exclude a transfer of a medium into the respective other layer of the heat exchanger to the greatest extent possible, the present invention provides that a diffusion layer is arranged between the first heat exchanger layer and the second heat exchanger layer which is open to diffusion for the gas to be temperature-controlled. This has the consequence that the gas to be temperature-controlled can penetrate to the outside along the diffusion layer and can there be detected via corresponding detectors. "Diffusion-open" means that the gas can move along the diffusion layer with a flow resistance that is lower than the flow resistance of the opposite heat exchanger layer. The gas thus seeks the easiest way out. This also happens because, for example, when hydrogen is used as the gas to be temperature-controlled, it is under high pressure and is thus also forced out of the medium channel through hairline cracks. Since a coolant, if one is present in the adjacent heat exchanger layer, is also conveyed at a pressure above atmospheric pressure, the flow resistance will be lower if the diffusion layer is chosen correctly so that the hydrogen is pressed along the diffusion layer and penetrates to the outside. Unnoticed penetration of hydrogen or a natural gas into the coolant can thus be reliably excluded.

The diffusion layer can, for example, be formed by a foil, which is placed between opposite heat exchanger layers, which can then be attached to each other. The foil thus forms a flow space between the heat exchanger layers for the medium to be temperature-controlled in case it should escape from the medium channel. Different thermal expansions of the two heat exchanger layers can also be compensated for by the foil because the foil has a mechanically decoupling effect. This makes it possible for materials with roughly different expansion coefficients to be joined together. This is particularly advantageous for media such as hydrogen, which significantly limit the choice of materials for the heat exchanger layer. Such a foil can also compensate for unevenness on the surfaces of the heat exchanger layers which leads to an increase in the heat-transferring contact area compared to a design in which the layers are attached directly to each other.

It is particularly advantageous to make the diffusion layer from graphite. A diffusion layer made of graphite combines a high thermal conductivity with a very low thermal contact resistance.

It is in particular advantageous if the diffusion layer is formed from a pyroelectric graphite. In the case of a graphite foil design, there is the additional advantage that these adapt very well to the contact surfaces so that a large heat transfer surface is created and unevenness can be compensated for. Although the thermal conductivity depends on the direction, it is possible to create foils with a lower thermal conductivity only in the z-direction, i.e., in the thickness direction of the foil, but this is insignificant because these foils can be produced with layer thicknesses of less than 20 μm so that sufficient rapid heat conduction still exists. The thermal conductivity in the z-direction of greater than about 15 W/° C. is additionally still significantly higher than conventional thermal conductive foils which have a thermal conductivity of about 1 W/C.° in the z-direction. In contrast to conventional thermal conductive foils, these foils therefore do not represent a significant thermal conduction resistance.

Graphite is generally not directional (for example, pressed amorphous graphite powder). The thermal conductivity of pyroelectric graphite in the z-direction (normal to the contact area) is, however, lower than that of metals such as copper or aluminum, but this is insignificant as these foils can be produced with layer thicknesses of less than 20 μm. The use of pyroelectric graphite also has the advantage that the thermal conductivity in the direction of the contact layer (corresponding to the x-y plane) is particularly high. This is in particular up to five times more efficient than copper and thus only slightly less thermally conductive than diamond which is considered to be the best known thermal conductor. It is therefore possible to increase the overall efficiency of the heat exchanger by distributing the heat more evenly in the heat exchanger layer.

It is particularly advantageous if the graphite is a pyrolytic graphite. This has an excellent thermal conductivity of up to 1950 W/mK and thus a five times higher thermal conductivity than copper. There is also an efficient heat distribution in the x- and y-direction, i.e., in an extension direction when using a foil. There is accordingly an excellent full-surface heat transfer between the pyrolytic graphite and the adjacent heat exchanger layers. This pyrolytic graphite is also open to diffusion so that the space formed by the diffusion layer can be used for the flow of the medium to be cooled.

The diffusion coefficient of hydrogen in graphite is, for example, not suitable for transporting significant amounts of hydrogen to the outside. The transported quantity is not, however, a disadvantage due to the very sensitive gas detectors available. On the contrary, the concentration of process gas in the environment must be limited to fractions of a percent anyway, regardless of the heat exchanger, in order to prevent an explosive environment. Detectors should therefore respond at just a few ppm by volume of process gas in the environment independent of the heat exchanger.

The thermal conductivity of the diffusion layer should, for example, be above 700 W/mK, in particular above 1000 W/mK, which provides that no degradation of the heat transfer between the two heat exchanger layers is produced by the diffusion layer.

In an embodiment of the present invention, a coolant channel can, for example, be formed in the second heat exchanger layer. With this coolant, a very large amount of heat can be removed from the medium channel of the first heat exchanger layer in a short time with correspondingly high coolant flows and high temperature differences.

In such an embodiment, the diffusion layer advantageously lies directly against the first heat exchanger layer and the second heat exchanger layer so that different thermal expansions as well as unevenness can be compensated for, whereby a large-area support is achieved that leads to very good heat transfers.

In an alternative embodiment of the present invention, thermoelectric elements can, for example, be arranged between the first heat exchanger layer and the second heat exchanger layer. These thermoelectric elements serve primarily to heat the gas to be temperature-controlled in a short time and very precisely by applying an electrical voltage to the thermoelectric elements. Such thermoelectric elements are, for example, Peltier elements.

In a continuation of this advantageous embodiment, a diffusion layer can, for example, be arranged between the thermoelectric elements and the first heat exchanger layer so that the hydrogen is already removed from the temperature control device before it penetrates to the thermoelectric elements. The heat transfer to the thermoelectric elements is also improved because very good heat conduction takes place along the diffusion layer, whereby temperature differences between areas that are directly adjacent to the thermoelectric elements and the areas in between are very well compensated for.

It is also useful if a diffusion layer is arranged between the thermoelectric elements and the second heat exchanger layer, which also prevents penetration of hydrogen to the coolant or vice versa, thereby allowing coolant to escape via the diffusion layer if a hairline crack occurs and improving heat transfer to the thermoelectric elements.

An even better cooling and/or heating effect is achieved if a second heat exchanger layer is arranged on both sides of the first heat exchanger layer, whereby a diffusion layer is formed between each second heat exchanger layer and the first heat exchanger layer. The penetration of the medium to be temperature-controlled into the coolant flow or into the second heat exchanger layer is also prevented for both sides and a flow path with low pressure loss is provided for escaping of gas. The thermoelectric elements can of course also be placed between the first heat exchanger layer and the second heat exchanger layer on both sides.

The medium channel for the gas to be temperature-controlled and/or the coolant channel can, for example, be spiral-shaped. The spiral shape achieves a long cooling distance with a longer residence time of the medium to be cooled and at the same time the most uniform temperature distribution possible in the heat exchanger and consequently a high cooling efficiency. A counter-rotating spiral section in the first heat exchanger layer and in the second heat exchanger layer is in particular advantageous as this creates a counter-flow heat exchanger in which the maximum possible achievable temperature difference between the inlet and the outlet of the medium to be temperature-controlled is greater.

It is also advantageous if the first and/or the second heat exchanger layer are manufactured additively. This eliminates an additional heat transfer between the respective channel-bounding materials and the respective layer of the heat exchanger itself, i.e., the plate in which a cooling coil is, for example, arranged. The manufacturing process is inexpensive and easy to carry out. Additive manufacturing process is in particular understood to mean 3D printing.

The coolant channel in the second heat exchanger layer can, for example, be connected to a coolant line in which a coolant control valve is arranged. It is possible via this coolant control valve to either completely block or precisely control the coolant flow, whereby the heat dissipation can also be precisely controlled and thus a target temperature of the medium to be temperature-controlled can be set.

The thermoelectric elements can, for example, be supplied with current to heat the medium to be temperature-controlled in such a way that at most the full nominal power of the thermoelectric element is provided while the coolant control valve is closed. This means that the control for heating the medium flow to be temperature-controlled is carried out completely via the thermoelectric elements. The coolant flow must be shut off due to the usually lower temperature of the coolant flow in order not to create a too high temperature difference at the thermoelectric element, which would in turn lead to a readjustment of the current and thus to an increased heat loss in the Peltier element, which would counteract the desired heat transfer output to the first heat exchanger layer.

It can in principle be favorable if 100% of the nominal power of the thermoelectric elements is provided, but the thermoelectric elements can, for example, be supplied with current for cooling the medium to be temperature-controlled in such a way that at most half the nominal power of the thermoelectric elements is reached while the coolant control valve is at least partially open. This means that the cooling power is primarily introduced by the coolant. The thermoelectric element is controlled in such a way that it forms a minimum thermal resistance and generates as little heat flow as possible, which would otherwise have to be dissipated again. The thermoelectric element is thus used in a supportive manner to reduce the temperature difference and increase the dynamics of the control which cannot be introduced by the coolant flow alone. In contrast to the heating operation, it is particularly important when energizing that the direction of the current is reversed by the Peltier elements (warm side becomes cold side and vice versa).

A temperature control device for a gaseous or liquid medium, in particular for hydrogen or natural gas, is thus provided with which a high dynamic of control is achieved both during heating and cooling of the medium flow and where a penetration of the gas to be cooled into the coolant flow is reliably prevented. A narrow space is created through which the gas to be temperature-controlled can penetrate to the outside with low pressure loss, whereby contamination of the coolant can be excluded.

Two embodiments of temperature control devices for a gaseous media according to the present invention are shown in the drawings and are described below.

The temperature control device according to the present invention consists of a first heat exchanger layer 10, in the interior of which a spiral-shaped medium channel 12 is formed for a medium to be temperature-controlled, in particular hydrogen. The spiral-shaped medium channel 12 is supplied with hydrogen via a radially outer medium inlet connection 14, which can leave the spiral-shaped medium channel 12 again via a radially inner medium outlet connection 16. Pressures of up to 30 bar can exist in the spiral-shaped medium channel 12.

Above and below each of the first heat exchanger layers 10, a second heat exchanger layer 18, 19 is attached to the first heat exchanger layer 10 via screws 20 which protrude through screw eyes 22 on the flange-shaped heat exchanger layers 10, 18, 19.

A first inner coolant inlet port 24 and a radially outer first coolant outlet port 26 are formed on the upper second heat exchanger layer 18, which are connected to each other via an inner spiral coolant channel 28 in the upper second heat exchanger layer 18. A second inner coolant inlet port 30 and a radially outer second coolant outlet port 32 are similarly formed on the lower heat exchanger layer 18, 19, which are also connected to each other via an inner spiral-shaped coolant channel 34 in the second heat exchanger layer 19. Both coolant channels 28, 34 are thus flowed through in the same flow direction, which is opposite to the flow direction of the hydrogen in the spiral-shaped medium channel 12, so that a counterflow heat exchanger is created.

In order to have sufficient chemical resistance and a low weight, a temperature control device constructed in this way is designed, for example, so that the first heat exchanger layer 10 is made of stainless steel in an additive manufacturing process, such as 3D printing, and the second heat exchanger layers 18, 19 are made of aluminum or an aluminum alloy in an additive manufacturing process. In addition to the possibly different materials, very large temperature differences also occur in the different heat exchanger layers 10, 18, 19. All this can lead to stresses between the heat exchanger layers 10, 18, 19 or also to internal stresses in the heat exchanger layers 10, 18, 19 during temperature changes, which can in turn lead to a formation of microscopic cracks. Such hairline cracks also become more likely due to the high pressures in the medium channel, and the gas is forced through the hairline cracks. If hydrogen or another flammable gas is in particular used as the gas to be temperature-controlled, it must be urgently excluded that this gas penetrates into the coolant, whereby this could reach the cooling aggregate via the coolant, which is not designed and/or approved for flammable or explosive media.

In the design of the temperature control device constructed in this way, it is also particularly important to have a maximum thermal conductivity. The first heat exchanger layer 10 could therefore also be made of silicon. A third possibility would be to manufacture the first heat exchanger layer 10 from a special aluminum alloy, such as AlMgSi. These alloys have the best thermal conductivity and at the same time are suitable for use with $H_2$. Copper is, however, usually a component of aluminum alloys so that it is easier to process.

The present invention accordingly proposes to arrange a diffusion layer 36 between the heat exchanger layers 10, 18, 19 which is open to diffusion by the gas to be temperature-controlled so that the gas can flow through the interior of the diffusion layer 36. Due to the pressure in the spiral-shaped medium channel 12, the gas is forced through the diffusion layer 36 into the air surrounding the heat exchanger. Penetration of the gas into one of the coolant channels 28, 34 can be prevented for this reason because overpressure also exists in the coolant channels 28, 34, which is the reason why the gas seeks the path of least resistance along the diffusion layer 36 and can there be detected, outside the heat exchanger layers 10, 18, 19.

A pyrolytic graphite foil is in particular used as diffusion layer 36, which has a thermal conductivity in the range between about 700 W/mK and 1900 W/mK. In addition to this very high thermal conductivity, this foil also has a certain elasticity, whereby unevenness of the opposing surfaces of the heat exchanger layers 10, 18, 19 can be compensated for, thereby resulting in the contact surface being increased, which in turn leads to an overall improved heat exchange between the heat exchanger layers despite the presence of an additional intermediate layer.

The temperature of the medium to be temperature-controlled is controlled by regulating the coolant flow through the spiral coolant channels 28, 34 via a coolant control valve 38 which is arranged in a coolant line 40 leading to the second heat exchanger layers 18, 19, as well as a coolant temperature, which could be set by an external additional heat exchanger and/or a full cooling unit with a heat pump.

Figure 3:
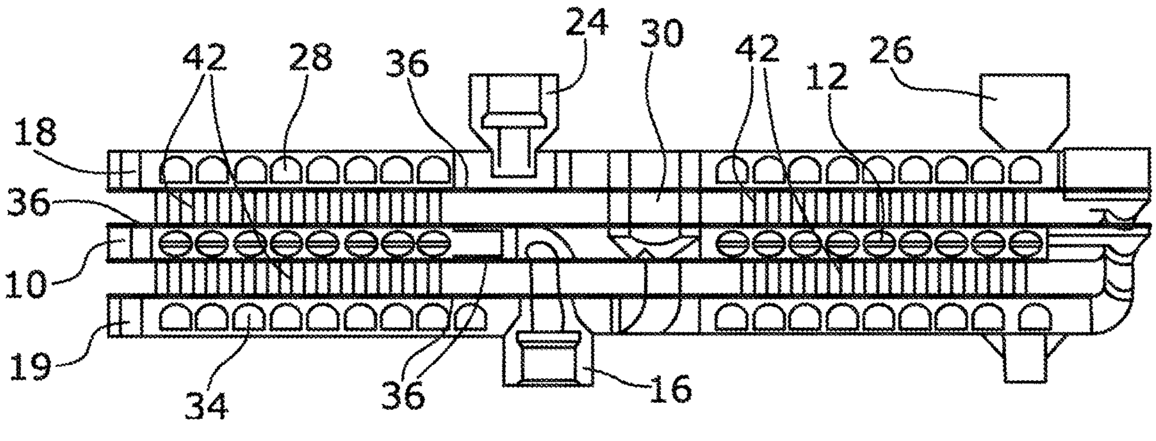
FIG. 3 shows a cross-section of an alternative temperature control device according to the present invention.
Figure 4:
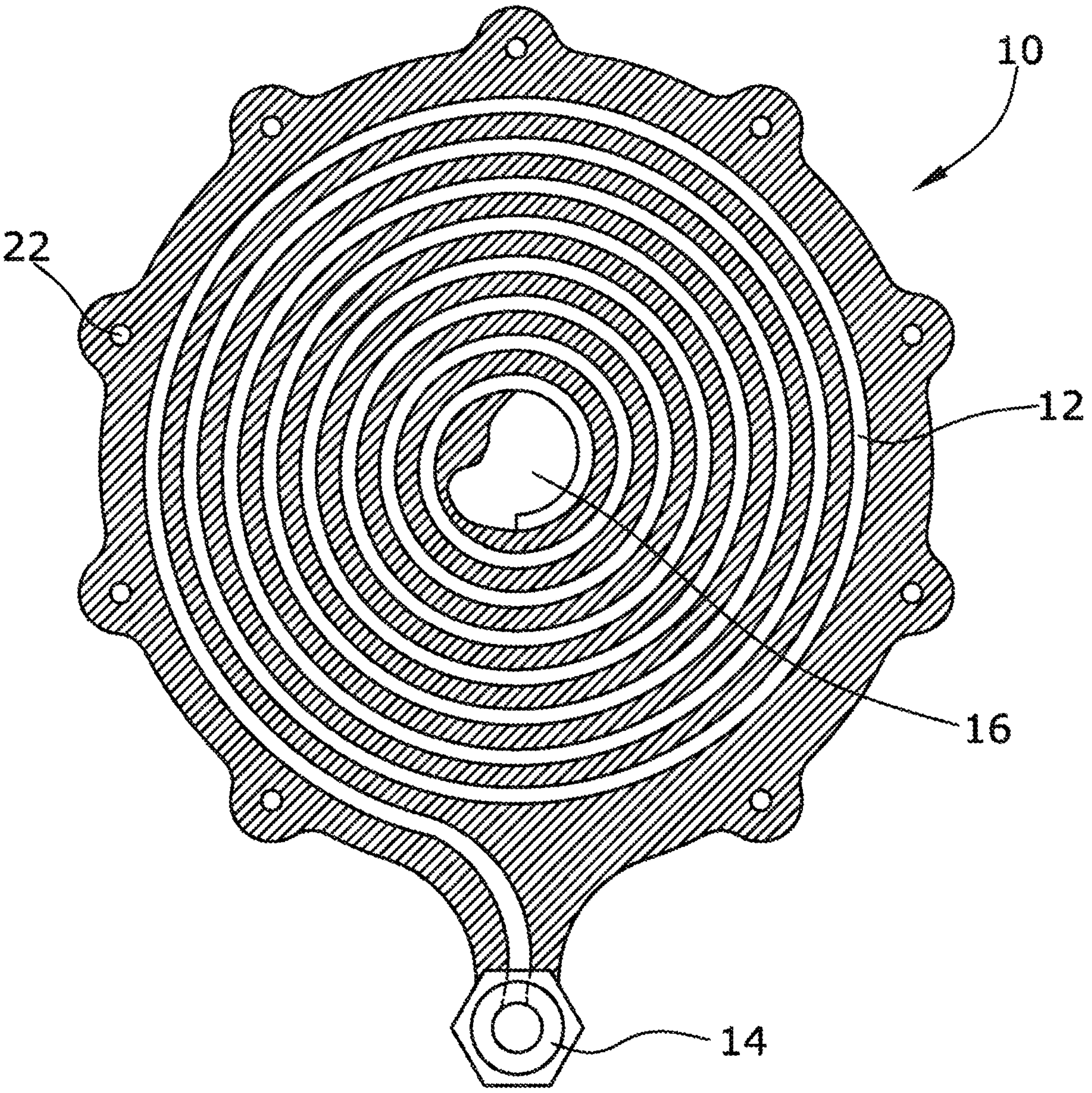
FIG. 4 shows a longitudinal section through the central position of the temperature control device of FIG. 1 and FIG. 3.

In order to be able to completely waive temperature control of the coolant and to be able to carry out fast and effective temperature control of the medium flow and at the same time to be able to both cool and heat the gas to be temperature-controlled, several thermoelectric elements 42, in particular Peltier elements, can be arranged between the first heat exchanger layer 10 and each of the second heat exchanger layers 18, 19, as is shown in FIG. 3.

By energizing the thermoelectric elements 42, a heating of the medium flow in the spiral-shaped medium channel 12 can be carried out, whereby the side of the thermoelectric elements 42 facing the spiral-shaped medium channel 12 is heated, while the side of the thermoelectric elements 42 facing the second heat exchanger layers 18, 19 is cooled by the applied voltage. The coolant control valve 38 is closed in this state so that no heat is dissipated via the coolant.

If the medium to be temperature-controlled is to be cooled down, the voltage at the thermoelectric elements 42 is reduced in a first step, whereby a heat supply is reduced. If this is not sufficient, the coolant control valve 38 is opened again so that heat is dissipated from the thermoelectric elements 42 and in particular from the gas to be temperature-controlled. A voltage reversal is here performed on the thermoelectric elements 42, whereby the warm side and the cold side are exchanged. It is important that the current is only applied to achieve a nominal power of the thermoelectric elements 42 in the range of approximately 10% to 30%, as heat loss is generated in the thermoelectric elements 42, which would also need to be dissipated. The low current flow through the thermoelectric elements 42 reduces their thermal resistance so that heat can be extracted from the gas to be temperature-controlled via the conductive thermoelectric elements 42 by the pumped coolant. Rapid temperature changes with small temperature differences can then be carried out by changing the current flow to the thermoelectric elements 42.

In this embodiment, diffusion layers 36 in the form of pyrolytic graphite foils are arranged both between the thermoelectric elements 42 and the first heat exchanger layer 10 and between the thermoelectric elements 42 and the second heat exchanger layer 18, 19, respectively. This has the advantage that the hydrogen diffuses again along the diffusion layers 36 and is thus conveyed to the outside between the first heat exchanger layer 10 and the second heat exchanger layer 18, 19 without being able to penetrate into the area of the coolant channels 28, 34. Hydrogen or the gas to be temperature-controlled can accordingly reach a detector without penetrating the coolant.

The diffusion layers 36 also act as excellent heat conduction elements, which significantly improve the connection of the thermoelectric elements 42 to the first heat exchanger layer 10 as well as to the second heat exchanger layers 18, 19. The very good heat conduction in the direction of extension of the graphite foils above all leads to a very even temperature distribution at the second heat exchanger layers 18, 19, even if no full-surface connection of the thermoelectric elements 42 exists.

A very precise temperature control is accordingly possible and existing heat losses are minimized. There is at the same time a high level of safety against damage caused by flammable coolant.

It should be clear that the scope of protection of the present invention is not limited to the described embodiments, but that various modifications are possible. For example, several first and second coolant layers can also be arranged alternately on top of each other. Only a second heat exchanger layer can also be used. Reference should also be had to the appended claims.

LIST OF REFERENCE NUMERALS

10 First heat exchanger layer
12 Spiral-shaped medium channel
14 Medium inlet connection
16 Medium outlet connection
18 Second heat exchanger layer
19 Second heat exchanger layer
20 Screw
22 Screw eye
24 First inner coolant inlet port
26 Outer first coolant outlet port
28 Inner spiral coolant channel
30 Second inner coolant inlet port
32 Outer second coolant outlet port
34 Inner spiral-shaped coolant channel
36 Diffusion layer
38 Coolant control valve
40 Coolant line
42 Thermoelectric element

What is claimed is:

1. A temperature control device for a gaseous media, the temperature control device comprising:

a first heat exchanger layer in which a medium channel for a gas to be temperature-controlled is formed;

a second heat exchanger layer which is configured so that heat is at least one of extractable from and suppliable to the first heat exchanger layer; and a diffusion layer which is arranged between the first heat exchanger layer and the second heat exchanger layer, the diffusion layer being open to a diffusion for the gas to be temperature-controlled, wherein, the second heat exchanger layer comprises a coolant channel formed therein, the coolant channel is configured to convey a coolant, and the diffusion layer being open to diffusion for the gas to be temperature-controlled is provided so that an unnoticed penetration of the gas to be temperature-controlled into the coolant is reliably excludable.

2. The temperature control device as recited in claim 1, wherein the diffusion layer is formed by a foil.

3. The temperature control device as recited in claim 2, wherein the foil is made of a graphite.

4. The temperature control device as recited in claim 1, wherein the diffusion layer is made of a graphite.

5. The temperature control device as recited in claim 4, wherein the graphite is a pyrolytic graphite.

6. The temperature control device as recited in claim 1, wherein the diffusion layer has a thermal conductivity which exceeds 700 W/mK.

7. The temperature control device as recited in claim 1, wherein the diffusion layer directly contacts both the first heat exchanger layer and the second heat exchanger layer.

8. The temperature control device as recited in claim 1, wherein the second heat exchanger layer comprises a coolant channel formed therein.

9. The temperature control device as recited in claim 8, wherein at least one of the medium channel for the gas to be temperature-controlled and the coolant channel have a shape of a spiral.

10. The temperature control device as recited in claim 8, further comprising:

thermoelectric elements which are arranged between the first heat exchanger layer and the second heat exchanger layer.

11. The temperature control device as recited in claim 10, wherein the diffusion layer is arranged between the thermoelectric elements and the first heat exchanger layer.

12. The temperature control device as recited in claim 11, further comprising:

an additional diffusion layer, wherein, the additional diffusion layer is arranged between the thermoelectric elements and the second heat exchanger layer.

13. The temperature control device as recited in claim 10, wherein the diffusion layer is arranged between the thermoelectric elements and the second heat exchanger layer.

14. The temperature control device as recited in claim 10, further comprising:

a coolant line; and a coolant control valve which is arranged in the coolant line, wherein, the coolant channel which is formed in the second heat exchanger layer is connected to the coolant line.

15. The temperature control device as recited in claim 14, wherein the thermoelectric elements are energized to heat the medium to be temperature-controlled so that at most a full nominal power of the thermoelectric elements is provided while the coolant control valve is closed.

16. The temperature control device as recited in claim 14, wherein the thermoelectric elements are energized to cool the medium to be temperature-controlled so that at most half of a full nominal power of the thermoelectric elements is provided while the coolant control valve is at least partially open.

17. The temperature control device as recited in claim 1, further comprising:

an additional second heat exchanger layer; and an additional diffusion layer, wherein, the second heat exchanger layer is arranged on a first side of the first heat exchanger layer, the additional second heat exchanger layer is arranged on a second side of the first heat exchanger layer which is opposite to the first side, the diffusion layer is arranged between the second heat exchanger layer and the first heat exchanger layer, and the additional diffusion layer is arranged between the additional second heat exchanger layer and the first heat exchanger layer.

18. The temperature control device as recited in claim 1, wherein at least one of the first heat exchanger layer and the second heat exchanger layer are manufactured additively.

19. The temperature control device as recited in claim 1, wherein, the diffusion layer being open to the diffusion for the gas to be temperature-controlled has a first flow resistance for the gas to be temperature-controlled, the first heat exchanger layer and/or the second heat exchanger layer has a second flow resistance for the gas to be temperature-controlled, and the first flow resistance is lower than the second flow resistance.

20. The temperature control device as recited in claim 1, further comprising:

at least one detector which is configured to detect the gas to be temperature-controlled, wherein, the diffusion layer being open to the diffusion for the gas to be temperature-controlled is provided so that the gas to be temperature-controlled is pressed along the diffusion layer to penetrate to an outside of the diffusion layer so as to be detectable via the at least one detector at the outside of the diffusion layer.

* * * * *